Patented Nov. 7, 1922.

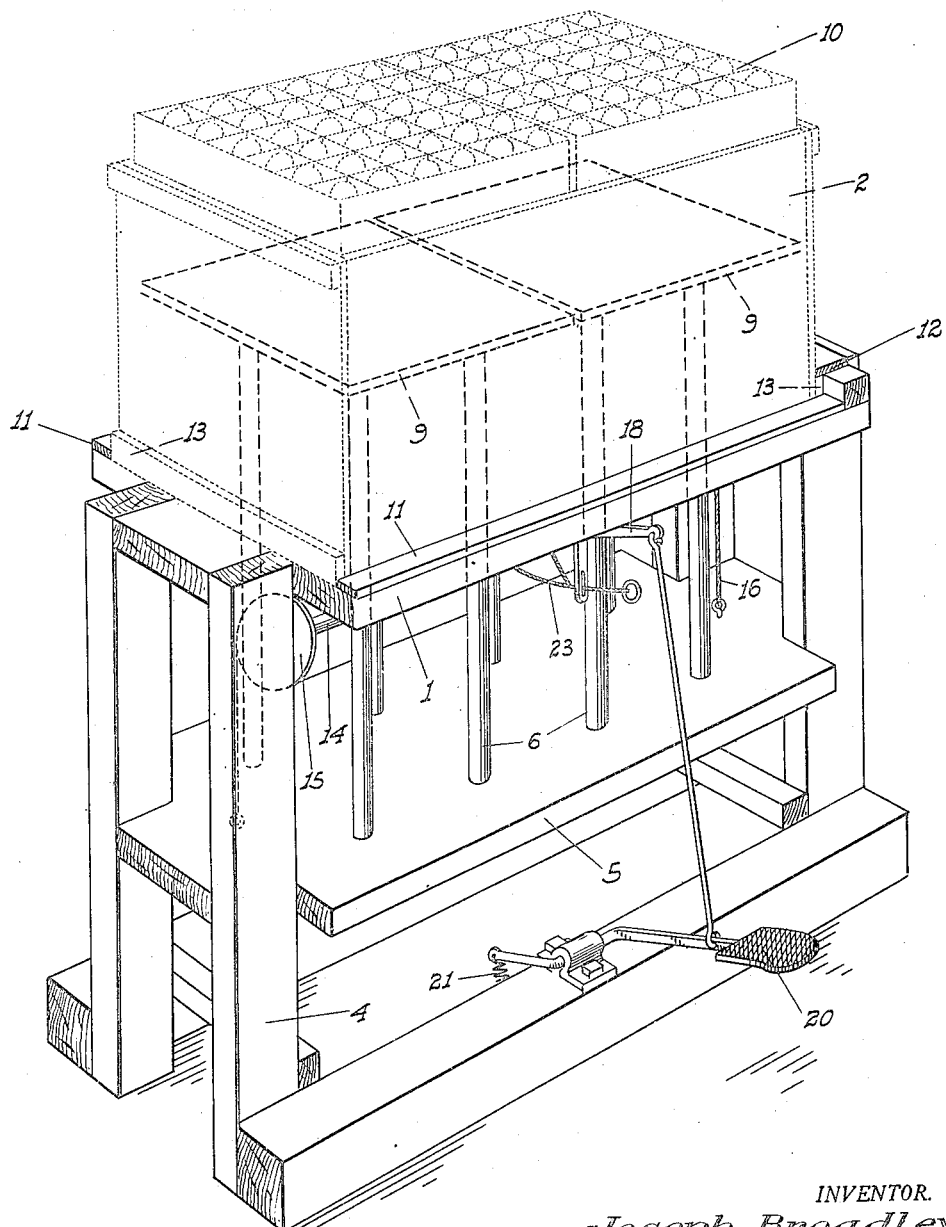

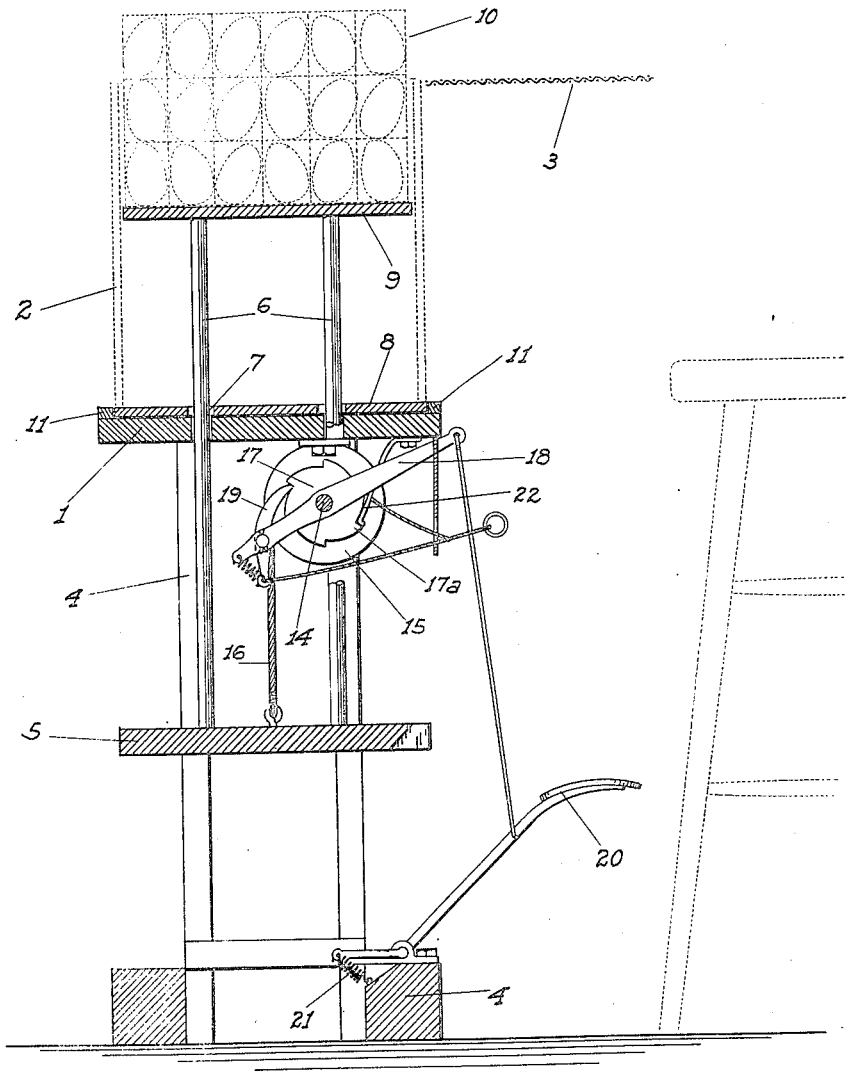

1,434,587

UNITED STATES PATENT OFFICE.

JOSEPH BROADLEY, OF FAIR OAKS, CALIFORNIA.

APPARATUS FOR HANDLING EGGS.

Application filed July 23, 1921. Serial No. 487,142.

*To all whom it may concern:*

Be it known that I, JOSEPH BROADLEY, a citizen of the United States, residing at Fair Oaks, in the county of Sacramento, State of California, have invented certain new and useful Improvements in Apparatus for Handling Eggs; and I do declare the following to be a full, clear, and exact description of the same, reference being had to the accompanying drawings, and to the characters of reference marked thereon, which form a part of this application.

This invention relates to improvements in handling eggs for candling, sorting and the like after they have been first roughly packed in the partitioned and individual trays with which the usual form of egg crate or box is now almost universally provided.

The eggs on being picked up in the hen houses, are placed without inspection in the individual and vertically stacked layers of trays of the crate as above mentioned. The crates are then taken to the packing or sorting shed, where the eggs must be removed for candling, sorting, etc., prior to their being again crated for shipment.

As far as I am aware, only two methods, both slow and cumbersome, are at present in vogue for removing the egg trays from the crate.

One is to remove each tray from the top of the crate, each lower one being naturally harder to withdraw than the preceding one on account of the increasing depth of the crate in which the hands of the operator must be inserted. The other method is to provide a crate with a removable side, necessitating special and relatively expensive construction of the crate.

My invention eliminates the above named methods, the principal object being to provide means for raising each tray in succession to a point so that the bottom of such tray will be just level with or slightly above the top of the crate. This enables the operator to slide each tray onto the usual table or belt positioned to be at the level of the top of the crate with my improved method, without the necessity of any lifting of the trays being done by the operator. This not only is a safeguard against breakage of the eggs through the collapse of the trays, which are of very flimsy construction, but enables the operator to handle a large quantity of eggs within a given time, without any increase, or rather with an actual decrease, of physical effort expended in handling the trays.

A further object of the invention is to provide for controlling the raising of the trays by means operated by either foot of the operator, thus leaving both hands free for the handling of the eggs.

A further object of the invention is to produce a simple and expensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a perspective view of the apparatus used in connection with my improved method.

Fig. 2 is a vertical cross section of the apparatus.

Referring now more particularly to the characters of reference on the drawings, the numeral 1 denotes a horizontal table positioned the height of a standard egg box or crate 2 below and to one side of the operator's table or belt 3, the operator being positioned on the opposite side of said belt.

The table 1 may be a structure independent of said belt and its supporting members (not shown) and be then provided with a supporting framework 4, or it may be supported from the supporting frame of the belt.

Slidably mounted in the frame 4 for vertical movement and parallel to the table 1 is a platform 5 having a plurality of upwardly projecting pins 6 adapted to project through guide holes in the table 1 and through somewhat larger holes 7 drilled through the bottom 8 of the crate 2, the upper ends of the pins then bearing against slidable and false bottom members 9 in the crate, and on which the lowermost of the egg trays 10 rest.

The crate is adapted to be slid endways onto the table 1 between guide cleats 11 thereon, and to be then positioned and held in place lengthwise of the table and against vertical movement at that end by means of a cross-bar 12 under which the end cleat 13 of the crate projects.

Any suitable means for raising the platform, and consequently the false bottoms of the crates, a distance equal to the height of an egg tray each time the platform is so moved, may be employed.

The operating structure here shown comprises a shaft 14 journaled under the table 1 between the same and the platform, and carrying on each end a sheave 15 to each of which is fixed one end of a cable 16 which projects downwardly to a connection with the platform.

Fixed on the shaft at any suitable point is a ratchet wheel 17, the arcuate length between any two teeth 17ᵃ of which is so proportioned with respect to the sheaves that a rotation of the wheel for such an arc-length will wind the cables on the sheaves just sufficient to raise the platform the height of an egg tray.

Such a movement may be imparted to the ratchet wheel by means of a lever 18 pivoted intermediate its ends on the shaft and having on one end a spring-pressed pawl 19 adapted to engage any one at a time of the teeth 17ᵃ the other end of the lever being connected to a treadle 20 pivoted on the frame 4 and projecting to lie within reach of the foot of the operator, the treadle being normally held in an upward position by means of a spring 21 and being arranged to be allowed only such an amount of travel as will rotate the ratchet wheel the necessary amount. A spring pawl 22 is fixed onto the table 1 or frame 4 and engages the wheel-teeth, so as to hold said wheel against rotation when the treadle and lever are returning to a normal position to be again actuated to rotate the ratchet wheel afresh.

In order to release the pawls from the ratchet wheel to permit the platform and false bottoms to return to their lowermost positions when the egg box is empty a branched cord 23 adapted to be pulled by the operator, is connected to said pawls.

The operation of the device is thought to be self-evident. The platform being in its lowermost position the pins thereon lie flush with the top of the table. A full egg box may then be slid thereon into position, and the treadle then depressed by the operator and immediately released, returning to its original position, and leaving the top egg trays projecting above the top of the box from which point it may readily be slid onto the belt. When this tray is disposed of, the treadle is again depressed, the next layer of trays is projected above the box, and so on until the box is emptied, when the platform is lowered by releasing the pawls, and another box placed on the table.

If thought desirable to avoid the sudden dropping of the platform on the release of the pawls, a counterbalancing weight may be attached thereto, this weight being just enough lighter than the platform and its connected parts to allow the latter to move downward gently.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. An apparatus for handling eggs including with an egg box having a false bottom, supporting means for said box, and vertical members mounted with the support and adapted to be projected thereabove to engage and raise the false bottom.

2. An apparatus for handling eggs as stated comprising in combination with an egg box having a perforated bottom and a false movable bottom above the same, a table on which the box is placed, and vertical pins movable in unison projecting through the table and adapted to project through the perforations of the bottom of the egg box to bear against the false bottom.

3. An apparatus for handling eggs as stated comprising in combination with an egg box having a perforated bottom and a false movable bottom above the same, a table on which the box is placed, vertical pins movable in unison projecting through the table and adapted to also project through the perforated bottom to bear against the false bottom, and means for raising the pins a predetermined distance at a time.

4. An apparatus for handling eggs as stated comprising in combination with an egg box having a perforated bottom and a false movable bottom above the same, a table on which the box is placed, vertical pins movable in unison projecting through the table and adapted to also project through the perforated bottom to bear against the false bottom, means for raising the pins a predetermined distance at a time, and means for then moving the pins to their lowermost position by a single operation.

In testimony whereof I affix my signature.

JOSEPH BROADLEY.